United States Patent [19]

McLafferty et al.

[11] Patent Number: 5,102,977

[45] Date of Patent: Apr. 7, 1992

[54] INTERNALLY CATALYZED SULFONATE BEARING HYDROXYL TERMINATED POWDER COATING POLYESTERS

[75] Inventors: John J. McLafferty, Hicksville; Kei-Yi Wei, Huntington, both of N.Y.

[73] Assignee: Ruco Polymer Corporation, Hicksville, N.Y.

[21] Appl. No.: 465,783

[22] Filed: Jan. 18, 1990

[51] Int. Cl.$^5$ .......................................... C08G 63/688
[52] U.S. Cl. .................................. 528/272; 528/293; 528/295; 528/300; 528/302; 528/308; 528/308.6; 528/373; 525/437; 525/444
[58] Field of Search ............... 528/272, 293, 295, 300, 528/302, 308, 308.6, 373; 525/437, 444

[56] References Cited

U.S. PATENT DOCUMENTS

| | | | |
|---|---|---|---|
| 3,546,008 | 12/1970 | Shields et al. | 428/395 |
| 3,563,942 | 2/1971 | Heilberger | 524/602 |
| 3,706,712 | 12/1972 | Davis et al. | 528/294 |
| 3,779,993 | 12/1973 | Kibler et al. | 528/295 |
| 3,842,021 | 10/1974 | Grant et al. | 428/402 |
| 3,853,820 | 12/1974 | Vachon | 528/295 |
| 4,073,777 | 2/1978 | O'Neill et al. | 528/295 |
| 4,156,073 | 5/1979 | Login | 528/295 |
| 4,167,395 | 9/1979 | Engelhardt et al. | 8/173 |
| 4,233,196 | 11/1980 | Sublett | 524/602 |
| 4,257,928 | 3/1981 | Vachon et al. | 524/386 |
| 4,299,743 | 11/1981 | Pierce et al. | 524/590 |
| 4,304,901 | 12/1981 | O'Neill et al. | 528/290 |
| 4,401,787 | 8/1983 | Chen | 524/603 |
| 4,427,557 | 1/1984 | Stockburger | 252/8.7 |
| 4,483,976 | 11/1984 | Yamamoto et al. | 528/295 |
| 4,499,262 | 2/1985 | Fagerburg et al. | 528/279 |
| 4,525,524 | 6/1985 | Tung et al. | 524/601 |
| 4,910,292 | 3/1990 | Blount | 528/272 |

FOREIGN PATENT DOCUMENTS 53-2536  1/1978  Japan.

Primary Examiner—John Kight, III
Assistant Examiner—Sam A. Acquah
Attorney, Agent, or Firm—Venable, Baetjer, Howard & Civiletti

[57] ABSTRACT

A hydroxyl functional polyester suitable for use in powder coating formulations and bearing sulfonate salt groups, its preparation, and its use in powder coating formulations with methoxyalkylene amino group bearing curatives are described. These polyester resins preferably have 200° C. ICI cone and plate viscosities between about 10 and 90 Poise, have DSC determined glass transition temperatures of at least about 40° C., have hydroxyl numbers between about 10 and 60, and have a sulfonate salt group content between about 0.25 and 4 weight percent. They are preferably synthesized by esterification or transesterification utilizing a sulfonate salt group bearing reactant such as 5-sodium sulfo isophthalic acid. The sulfonate salt groups, preferably alkali metal salt groups, serve to catalyze the curing reaction between the resin and the curative. A preferred powder coating composition involves a resin based on terephthalic acid, isophthalic acid and neopentyl glycol and tetramethoxymethyl glycol uril in a resin to curative weight ratio of between about 90:10 and 94:6.

26 Claims, No Drawings

5,102,977

INTERNALLY CATALYZED SULFONATE BEARING HYDROXYL TERMINATED POWDER COATING POLYESTERS

BACKGROUND OF THE INVENTION

Powder coating compositions have become increasingly important and substantial research has been devoted to improving their properties and performance. These coating compositions are free flowing powders which are sprayed on a substrate commonly utilizing electrostatic spray apparatus, and then melted to form a film or coating. The powders may simply melt and resolidify to form a thermoplastic coating or they be formulated such that they undergo a curing reaction to yield a thermoset or crosslinked coating. These thermoset coatings have been found to have significant advantages over the thermoplastic coatings in many applications. Thus, the thermosetting powder coating formulations have come to serve the bulk of the powder coating market.

Intermediate molecular weight polyesters based on aromatic dicarboxylic acids, particularly terephthalic acid, have come to be a major ingredient in such thermosetting powder coating formulations. These polyesters are synthesized to have either hydroxyl or carboxyl functionality. The carboxyl terminated polyesters are combined with curatives which have epoxy functionality while the hydroxyl terminated polyesters are combined with blocked isocyanates. Powder coating compositions were disclosed, for instance, in U.S. Pat. Nos. 3,624,232 and 3,842,021, in which hydroxyl terminated polyesters were combined with a hexamethoxymethylmelamine curative. However, these systems were not accepted by the market place.

The failure of the melamine curatives to obtain an acceptance in the market was probably due to the structure of the market and the nature of the curative. The manufacturers of powder coating compositions typically purchase the polyester resin component and the curative and combine them with other ingredients such as pigment and flow aids in extrusion blenders. The melamine curatives are room temperature liquids which makes incorporating them into the composition by extrusion on a commercial scale somewhat burdensome.

More recently, aminoplast curatives which are solids at room temperature have been developed. One of these is hexamethoxymethyl glycol uril, which is marketed by American Cyanamid as Cymel 1174. However, it has been difficult to find an appropriate catalyst with which to promote the reaction of this curative with hydroxyl terminated polyesters under conditions acceptable to the powder coating industry. An appropriate catalyst must not adversely affect the production of the powder coating composition by causing premature curing, for instance during the extrusion blending step. On the other hand, it must ensure curing under the time and temperature constraints of the industry.

Some initial success was obtained with benzoin tosylate but this material has become unavailable due to toxicity problems. Alternative catalysts were either too active under extrusion blending conditions, for example, toluene sulfonic acid, or not active enough under curing or baking conditions, for example, an aminomethyl propanol-toluene sulfonic acid adduct.

Another approach which predated that of powder coatings was solvent-borne coatings and more recently aqueous coating systems. In this field as well, some coating techniques involved a simple deposition of a film or coating with evaporation of the carrier medium while others involved a chemical reaction which yielded a cross linked thermoset coating. Increasing concern with the environment made it attractive to make as much of the carrier medium as possible water for both of these types of coating.

One approach to obtaining higher water contents in these carrier mediums is to utilize water compatible or water dispersible polymers to form the coating. Polymers of interest for forming coatings can be given improved water compatibility by incorporating pendant ionic salt groups into the polymer chain. Typical salt groups are those based on carboxylic or sulfonic acid and an alkali metal, such as sodium. Indeed, improving the water compatibility of organic compounds through the incorporation of sulfonate salt groups dates back to very old dyestuff chemistry.

The water compatibility of coating polymers can be further improved by limiting their molecular weight and their melt points or glass transition temperatures. This approach is particularly applicable to those systems in which the coating polymer will be further reacted to form a thermoset or cross linked coating. In such cases, it is not necessary for the dispersed polymer itself to have sufficient molecular weight or physical properties to form a good coating.

Recently, Eastman Chemical Products, a subsidiary of Eastman Kodak, has begun to promote a sulfonate group bearing hydroxyl terminated polyester designed for use in aqueous systems (Waterborne Polyester Resin WB-17-1NS). Eastman does not market the polyester but sells the 5-(sodiosulfo)isophthalic acid and is evidently trying to create a market for it. This polyester is formed by the esterification of isophthalic acid, 5-sodium sulfo isophthalic acid, adipic acid, trimethylol propane and neopentyl glycol. It cold flows at room temperature, as a result of its chemical make-up with the acids in a ratio of 57:3:40 and the polyols in the ratio of 14.8:85.2. Both the 40 mol percent adipic acid content and the 14.8 mol percent trimethylol propane branching agent serve to suppress the glass transition temperature below room temperature (20° C.). It has an acid number of 6, a hydroxyl number of 65 and a 150° C. ICI con and plate viscosity of 54 Poise.

This polyester is reported to yield good coatings when cured with hexamethoxymethylmelamine in a resin to curative weight ratio of 70:30. However, the coating composition is only about 44% solids with the balance being a mixture of water and isopropanol. This composition is catalyzed with paratoluene sulfonic acid (PTSA).

This polyester would have no utility as a powder coating resin because of its very low glass transition temperature (which must be lower than ambient temperature since it cold flows at ambient temperature). Furthermore, while it carries sulfonic acid salt groups, their function is clearly just to enhance the water dispersibility of the polyesters. The literature promoting this polyester gives no indication that these sulfonic acid salt groups could serve any other function and, in fact, this literature calls for a PTSA catalyst to promote curing with the hexamethoxymethylmelamine curative, in an aqueous medium.

It has now been discovered that these sulfonic acid salt groups will, in a molten system of resin and curative, catalyze the reaction of hydroxyl groups and methoxy alkylene amino groups, such as those carried by hexamethoxymethylmelamine. Thus, an incentive has been provided for chemically incorporating such groups into polyesters which do have appropriate properties for formulation into powder coating compositions. Such polyesters can be used to produce powders which have a reasonable degree of resistance to agglomeration under typical field storage conditions and appropriate molten flow characteristics under typical curing conditions.

SUMMARY OF THE INVENTION

A polyester resin suitable for powder coating and curable through the reaction of its hydroxyl groups with the methoxyalkylene amino groups of a curative is obtained by incorporating a sulfonate salt group into the structure of a polyester resin with hydroxyl functionality and the softening characteristics required of powder coating resins. The salt group is advantageously incorporated via a hydroxy or carboxy functional reactant which is included in the synthesis of the polyester by esterification or transesterification. The polyester resin is advantageously formulated into a powder coating composition by heating it above its softening point but below the temperature at which it will react with a methoxyalkylene amino group bearing curative and subjecting it to shear with this curative to yield a substantially homogeneous mixture which is then converted to a powder, typically by cooling and pulverization. The powder coating composition is then applied to a substrate, typically by electrostatic spraying, and then cured by heating to a temperature sufficient to cause reaction of the hydroxyl groups of the polyester resin with the methoxyalkylene amino groups of the curative. The sulfonate salt groups of the polyester resin evidently catalyze this reaction so that it occurs at temperatures and times compatible with powder coating practices.

DETAILED DESCRIPTION OF THE INVENTION

The polyester resins useful in the practice of the present invention may be synthesized from any of the polyester forming reactants which have been found useful in the synthesis of polyester resins used to formulate powder coatings. These reactants should be combined in such a way as to yield polyester resins with an appropriate hydroxyl group content and with appropriate softening characteristics. In a preferred embodiment the polyester forming reactants also include one or more sulfonate salt group bearing reactants. In any case the polyester resins are chemically modified during or after synthesis to have a sufficient sulfonate salt group content to facilitate their reaction with methoxyalkylene amino groups. Typically, it is the pendant and terminal hydroxyl groups of these resins which are the active sites for reaction with the methoxyalkylene amino groups.

Polyester resins useful in the powder coating arts are typically synthesized from an acid component and a polyol component. The acid component comprises one or more dicarboxylic acids or esters of such acids although it may also include tri or tetra carboxylic acids, or their esters as well as carboxylic acid anhydrides. The polyol component comprises one or more diols although it may also include tri or higher hydroxy polyols. However, it is also possible to use a reactant bearing both carboxyl functional and hydroxyl functional groups.

The acid component is preferably comprised primarily of aromatic dicarboxylic acids, their esters or a combination of both. It is particularly preferred that at least about 65 mol percent of the acid component be aromatic dicarboxylic acids. If esters are utilized it is preferred that they be alkyl esters. In any case the esters should be formed by combination with hydroxyl bearing compounds which have higher vapor pressures than the constituents of the polyol component to be used with these esters. It is particularly preferred to use either the free acid or the dimethyl ester, with the free acid being especially preferred.

Among the aromatic dicarboxylic acids those of the phthalic acid family are particularly preferred. It is particularly preferred that the acid component comprise at least about 30 mol percent, more preferably at least about 60 mol percent and especially at least about 80 mol percent of terephthalic acid or its suitable esters, especially its dimethyl ester. It is also preferred to have a significant content of isopthalic acid especially between about 10 and 20 mol percent. The isophthalic acid moderates the stiffening effect of the terephthalic acid, thus among other things making it possible to fine tune the softening characteristics.

The acid component may also include aliphatic dicarboxylic acids and tri or tetra carboxylic acids. The aliphatic acids serve similar functions to that of the isophthalic acid in adjusting the polyester resins softening characteristics. They also impart better flow to the resin when it is coated on a heated substrate as part of a powder coating composition and may improve the impact characteristics of the cured coating. Particularly preferred among the aliphatic acids are adipic acid and succinic acid. On the other hand, the tri and tetra carboxylic acids serve to branch the polyester chain and increase its functionality. Included in this group are trimellitic acid and pyromellitic acid.

Those acids which form anhydrides may be used in the form of their anhydrides. These would include trimellitic anhydride, pyromellitic dianhydride and succinic anhydride.

The polyol component may be comprised of any hydrocarbon or substituted hydrocarbon which carries at least two primary or secondary hydroxyl groups and which is, with the exception of these hydroxyl groups, non-reactive under polyester formation conditions. The aliphatic and cycloaliphatic diols are preferred. It is particularly preferred to utilize at least a majority of lower alkyl diols. Included among the suitable diols are ethylene glycol, propane-1,2-diol, butane-1,2-diol, butane-1,4-diol, neopentyl glycol, hexane-2,5-diol, hexane-1,6-diol, 2,2-[bis-(4-hydroxyhexyl)]propane, 1,4-dimethylol cyclohexane, diethylene glycol, dipropylene glycol and 2,2-bis-[4-(2-hydroxyethoxy)]phenylpropane. It is especially preferred to utilize at least about 50 mol percent and more especially at least about 80 mol percent of neopentyl glycol and it is most preferred to use essentially all neopentyl glycol. This diol imparts particularly good weathering characteristics to finally cured coatings and it displays a particularly low degree of loss in polyester synthesis.

Higher hydroxy polyols may be included in the synthesis to branch the polyester chain and to increase the functionality of the resin. Thus they can be used to serve functions similar to those of the tri and tetra carboxy acids. Included among the suitable polyols are trimethylol propane, glycerin, hexanetriol, pentaerythritol, sorbitol, trimethylol ethane, triethylol propane, tris-(2-hydroxyethyl)-isocyanurate and dimethylolproprionic acid. Trimethylol propane is particularly preferred.

The polyester may be synthesized in accordance with established technology. In general, this involves subjecting the reactants to elevated temperatures, preferably in the presence of an appropriate catalyst, and to vacuum after some initial reaction has occurred. The application of vacuum is somewhat dependent upon the selection of initial reactants. If dialkyl carboxylic acid esters such as dimethyl terephthalate are utilized a vacuum will be required to strip off the excess diol used to initially displace the alkanol in the first step of the reaction. On the other hand, a direct esterification synthesis may be taken to completion without the use of any vacuum. However, even when the synthesis involves the free acid it is convenient to apply vacuum to drive the reaction. It is typical to add almost all of the reactants at the start of synthesis. In some cases, it is necessary to add a small amount of one or more of the reactants during the course of synthesis to adjust the value of one or more of the control parameters.

The precise ratios between the reactants depends upon the particular reactants used and the operating characteristics of the particular equipment utilized. However, a stoichiometric excess of hydroxyl bearing reactants will generally be necessary to obtain a reasonable degree of hydroxyl end group termination. For instance, if a dialkyl ester such as dimethyl terephthalate is utilized a greater excess of hydroxyl equivalents will be required than if the synthesis involves free dicarboxylic acids. A sufficient amount of polyol compounds are needed to displace the alkyl alcohol component of the ester and this is normally substantially more than is needed to obtain the finally desired hydroxyl to carboxyl equivalents ratio. Furthermore, some of the more volatile reactants are usually lost during the course of synthesis. Typically, the glycol component contains the more volatile compounds so that some excess of hydroxyl equivalents are required to compensate for this loss. The precise amount of the loss to be compensated for depends on the characteristics of the particular synthesis equipment used and the volatility of the constituents of the glycol components. Thus, for instance, ethylene glycol is more volatile than neopentyl glycol and consequently more of it is typically lost in synthesis.

If the reactants include a more than difunctional reactant such a trihydroxyl or tricarboxyl compound it is used in a relatively small amount. In such cases it is preferred to use between about 0.2 and 4 mol percent of such reactants based on the mols of the component, acid or polyol of which they are a part. It is particularly preferred to include between about 0.5 and 1.5 mol percent of such a reactant based on the mols of the component in which it is included.

The typical procedure involves charging the polyol reactants, heating until they are all molten and then charging the carboxylic acid reactants and the reaction catalyst. The reaction mass may then be heated to a temperature between about 180° and 240° C. and the esterification or transesterification products distilled off. If the carboxylic acid reactant is used as the free acid water will be the major distillate whereas if it is used as a dialkyl ester the corresponding alcohol will be the major distillate. The reaction is typically conducted until substantially all the polyol reactant has been consumed. A vacuum may then be applied to force to reaction to the desired end values. This portion of the reaction may also be conducted at between about 180° and 240° C. The vacuum and temperature should be balanced such that the excess reactant is distilled off as shorter polymer chains are joined. Vacuums between about 400 and 50 mm of mercury are convenient.

The synthesis may be promoted by any suitable catalyst. Included among the suitable catalysts are the organotin catalysts such as butylchloro tin dihydroxide and dibutyltin oxide. The catalyst may be used in any amount effective to promote the ester formation and not impair the attainment of the required molecular weight or adversely effect the properties of the polyester formed. It is preferred to use between of about 0.05 and 0.25 weight percent, based on the weight of the reactants.

If the synthesis utilizes a free acid component the course of the reaction may be conveniently monitored through the acid number of the reaction mass and the viscosity of the reaction mass. These two parameters may be balanced for a given set of reactants to yield a polyester with the desired softening characteristics and hydroxyl functionality. The acid number decreases during the course of the reaction and the viscosity increases. Both can be adjusted by the addition of an appropriate reactant. For instance the addition of a polyol component will decrease both parameters.

The appropriate balance for any given set of reactants can readily be determined by experimentation. In general a high viscosity combined with a high acid number will yield a product with a relatively low hydroxyl functionality. On the other hand, the melt viscosity of the polyester is generally reflective of its softening behavior with a higher viscosity being correlated to a higher softening range and a higher glass transition temperature (Tg) for a given set of reactants.

The reactants and the synthesis conditions should be adjusted to yield a polyester which is suitable for use in powder coating and which can be cured through its hydroxyl groups. This generally means that polyester particles should resist sintering under typically encountered field storage conditions, be processable in a compounding extruder with a curative and display melt flow under the thermal conditions used in the powder coating industry to cure coatings (typically between about 160° and 230° C.). It is preferred that they have a differential scanning calimetry (DSC) determined Tg of greater than about 40° C. more preferably greater than about 55° C. and have a 200° C. ICI cone and plate determined viscosity above about 10 and more preferably less than about 90 poise and most preferably between about 20 and 70 poise.

The polyester should have a sufficient hydroxyl functionality, i.e. on average carry a sufficient number of hydroxyl groups per macromolecule to yield a cured coating with good flexibility and impact resistance when cured with a curative bearing on average three or more groups per molecule reactive with hydroxyl groups. Good flexibility typically means the ability of the cured coating to maintain adhesion and resist cracking when the substrate to which it is adhered is bent 180 over a 0.125 inch (about 0.3 cm) diameter mandrel. Good impact resistance typically means the ability of the cured coating to resist spalling or cracking when the substrate to which it is adhered is subjected to an impact force of 80 inch pounds (about 9 N.m) or greater, preferably 160 inch pounds (about 18 N.m) or greater applied to the face opposite the one carrying the cured coating. It is preferred that the polyester have a coating. It is preferred that the polyester have a hydroxyl number greater than about 10 and that it bear an average at least two hydroxyl groups per macromolecule. It is particularly preferred that the hydroxyl number be between about 10 and 60, even more particularly between 20 and 50, with an special preference for values between about 25 and 50. Polyesters with hydroxyl numbers in excess of 40 may be somewhat disadvantageous for curing with methoxy alkylene amino group bearing curatives which release methanol on curing because of the difficulty of removing all the methanol evolved from the coating during curing.

It is also preferred that the polyester have an acid number less than about 15. It is difficult to synthesize a polyester which has both an adequate hydroxyl functionality and a high acid number, particularly when a higher molecular weight (which is reflected in both the ICI plate and cone viscosity and the Tg) is desired.

Either the acid component or the polyol component may also include a sulfonate salt group containing reactant. Any compound which carries both the salt group and is otherwise a suitable reactant for polyester synthesis should be suitable. To be suitable for polyester synthesis a compound needs to carry groups which will participate in the synthesis reaction and be otherwise stable under typical polyester forming conditions. It is generally preferred that the compound have a reasonably high sulfonate salt group content. However, it is also acceptable to use a compound which is itself built from compounds whose residues may form a part of the polyester backbone without adverse consequences. For instance, a polyester pre-polymer bearing a sulfonate salt group may be utilized. It is further preferred that the sulfonate salt group carrying compound be otherwise similar in structure to the other reactants typically utilized in preparing polyesters suitable for powder coating. It is particularly preferred that the sulfonate group be attached to an aryl ring.

An especially preferred class of compounds are sulfonate salt group bearing dihydroxy and dicarboxy benzenes and their derivatives. Included among these are 5-sodium sulfoisophthalic acid (5-SSIPA), its dimethylester and its diester with ethylene glycol.

The sulfonate salt group is the salt of a sulphonic acid and an appropriate cation. The nature of a suitable cation depends upon whether the sulfonate salt group will be incorporated as part of the polyester during synthesis or subsequently. In the former case, the salt group needs to be stable under the synthesis conditions while in the latter case, it need only be stable under typical compounding extrusion conditions. The alkali and alkaline earth metals are preferred, especially the alkali metals, with sodium and potassium being particularly preferred and sodium being the most preferred. However, other cations with the requisite stability such as tertiary and quaternary ammonium groups, particularly those with higher alkyl, cycloalkyl or aryl substituents such as octadecyldimethylbenzyl ammonium and lauryl pyridinium, are also suitable.

The polyester resin should have a sufficient content of sulfonate salt groups to catalyze its reaction with methoxy alkylene amino groups. It is conventional to assume that the active sites on the polyester backbone are the pendant and terminal hydroxyl groups.

The active groups of a number of attractive coating curatives are amino groups of this type, for instance the methoxy alkylene substituted glycol urils. A catalyst is normally required to cause reaction between these curatives and hydroxyl bearing polyesters under the time and temperature conditions acceptable to the powder coating industry. However, these curatives readily react with hydroxyl bearing polyesters with an adequate sulfonate salt group content under typical powder coating industry curing conditions.

On the other hand, the sulfonate salt group content should not be so high as to impair the use of such resins in formulating powder coatings. Typically, powder coatings are compounding by extrusion blending the polyester resin, the curative, and the additives such as colorants and flow aids. It is important that the resin and curative do not undergo any substantial degree of reaction under these compounding conditions.

It is preferred that the polyester resin have a sulfonate salt group content of between about 0.1 and 4 weight percent, more preferably between about 0.3 and 2 weight percent. Naturally, this translates into a significantly higher content of the compound used to incorporate these groups into the polyester. For instance, 5-sodium isophthalate has a salt group content of about 38 weight percent and thus a salt group content of 0.5 weight percent would require the incorporation of about 1.3 weight percent of this monomer.

It is important that the sulfonate salt group be chemically bonded to the polyester resin. If the sulfonate salt groups are supplied by physical blending of a carrier compound with the resin a significant catalytic effect is not observed under the conditions used to cure powder coatings. For instance, two parts of 5-sodium sulfo isophthalic acid was blended with 100 parts of a polyester resin with a hydroxyl number in the 20 to 30 range and with 6.4 parts of tetramethoxymethyl glycol uril. Baking an electrostatically sprayed coating of this blend at either 190° C. (375° F.) or 204° C. (400° F.) for 15 minutes failed to promote sufficient reaction to cause curing of the coating as reflected by the lack of impact resistance, solvent resistance and resistance to cracking in bending.

The chemical incorporation of the sulfonate salt groups is preferably accomplished during the synthesis of the resin. However, these groups may also be incorporated after synthesis, for example, by reaction of a carrier compound with the carboxyl or hydroxyl groups of the resin. In this case a sulfonic acid group may be incorporated and then neutralized, although such an approach would not be favored. It should be considerably easier to neutralize a sulfonic acid group carried by a monomeric carrier compound than one carried on a polymer chain.

If free sulphonic acid groups are incorporated into the resin they should be substantially neutralized. Free sulphonic acid groups may exert too strong of a catalytic effect on the hydroxyl group methoxy alkylene amino group reaction to be useful in the context of powder coating technology. It has been found that physically blending compounds bearing free sulphonic acid groups with hydroxyl functional polyester resins and methoxy alkylene amino group based curatives yields compositions which begin to cure in the course of extrusion compounding. It is expected that the chemical incorporation of free sulphonic acid groups into the polyester resin structure would result in an even more dramatic catalytic effect and preliminary experiments have supported this expectation. Thus, the catalytic effect of the sulphonic acid group should be moderated by the formation of a salt with a suitable cation.

The sulfonate salt group bearing polyester resin may advantageously be blended with a curative which carries methoxy alkylene amino groups. The curative should on average carry at least two such groups per molecule. The functionality of the curative should be such that when chemically reacted with the polyester resin it yields a cross linked coating. A convenient test of this cross linked state is resistance of the coating to disruption on being rubbed with a strong organic solvent such as methyl ethyl ketone (MEK). Naturally, if the polyester resin has a hydroxyl functionality sufficiently in excess of 2 (i.e., two hydroxyl groups per macromolecule) the curative need only be difunctional. However, it is preferred that the curative be at least trifunctional.

It is also preferred that the curative be a solid at room temperature. The practice in the powder coating industry is to compound powder coating composition by dry-blending together the polyester resin, the curative, appropriate additives and the desired pigmentation and then extruding the blend to yield a substantially homogeneous composition which is reduced to a fine powder. This processing is rendered substantially more difficult if the curative is a liquid. However, a liquid curative such as hexamethoxylmelamine can be blended with a polyester resin to yield a curative rich master batch. This master batch can then be utilized as a solid curative component in compounding powder coating compositions.

A preferred class of curatives are the methoxy alkylene substituted glycol urils. The methoxy methyl substituted glycol urils are particularly preferred and tetramethoxy methyl glycol uril commercially available from American Cyanamid Company (ACC) as Cymel 1174 is especially preferred. Another preferred curative is a master batch of hexamethoxymelamine (available from ACC as Cymel 303) and a hydroxyl terminated polyester resin.

The curatives should also have softening characteristics which allow them to be used in accordance with the established techniques of the powder coating industry. Thus, they should be capable of being extrusion compounded with the polyester resins and should not impair the flowability of formulated coating compositions under normal application and curing conditions. They may be either monomeric compounds or resinous materials. However, it is preferred to utilize curatives with fairly low equivalent weights. The lower the equivalent weight of a curative the less of it will be required to provide a curable coating with the polyester resin and consequently the less critical its softening characteristics. Curative with equivalent weights between about 70 and 200 are preferred with equivalent weights between about 80 and 150 being particularly preferred.

The polyester resin and the curative can be advantageously compounded into a powder coating composition with the other ingredients conventional in this art such as pigments and flow aids. The ratio between the resin and the curative should be reasonably close to stoichiometric. Too high a proportion of curative can undesirably plasticize the coating composition and may lead to the curative condensing with itself while too high a proportion of polyester resin can result in a partially cured coating which may not display the desired solvent resistance and impact resistance. Equivalents ratios of polyester resin hydroxyls to curative methoxy alkylene amino groups between about 1.30:1 and 0.8:1 are preferred with ratios between 1.2:1 and 0.90:1 being particularly preferred. In the case of the especially preferred tetra methoxy methyl glycol uril a weight ratio of polyester resin to curative between about 96:4 and 90:10 is preferred with ratios around 94:6 being particularly preferred with polyester resins with hydroxyl numbers around 25. In general, weight ratios of resin to curative between about 98:2 and 85:15 are preferred.

The sulfonate salt group bearing polyester resin of the invention may also be blended with other resins in formulating a powder coating. Certain other hydroxyl terminated polyesters are known to impart certain desirable properties such as flat finish or exceptional flexibility. One such class of polyesters are described in U.S. Pat. No. 4,859,760. These resins can be advantageously blended with a sufficient amount of the sulfonate salt polyesters to yield blends which have a sufficient level of catalysis for convenient use with the methoxy alkylene amino curatives. Thus, the sulfonate salt polyesters can be utilized as polymeric catalysts. In such cases, it may be advantageous to utilize polyesters with a rather high sulfonate salt group content.

The coating compositions are prepared by blending of the ingredients to obtain a reasonably homogeneous mixture. This blending is preferably effected by the compounding extrusion conventional in this art. Typically, this involves subjecting the materials being blended to substantial shear, usually applied by one or two rotating screws, and elevated temperatures between about 88° and 120° C. (190° and 250° F.). It is important that the coating composition and the extrusion conditions be balanced in such a way that substantially no reaction between the polyester resin and the curative occur during the course of extrusion. This could be achieved by utilizing less extreme extrusion conditions with more sensitive compositions but it is preferred that the compositions be tolerant of the full range of extrusion compounding conditions normally encountered in the powder coating industry.

The coating composition may include conventional opacifying agents or fillers such as titanium dioxide. If the coating composition is for an outdoor application, a weather resistant form of the opacifying agent such as the rutile form of titanium dioxide should be used. The amount of opacifying agent used will depend on its effectiveness in the particular polyester resin. For example, compositions containing between about 30 and 40 weight percent of titanium oxide are common in the powder coatings industry.

The coating composition may also include conventional flow aids such as benzoin and Resiflow P class of polyacrylate flow aids from Estron Chemicals. These additives typically make up between about 0.5 and 4 weight percent of the composition.

The complete coating composition is typically mechanically mixed at room temperature and then extrusion compounded. The extrudate is then pulverized to yield a powder which normally passes a Number 140 sieve, i.e., has a particle size less than about 105 microns.

The coating composition is usually applied by electrostatic spraying followed by curing at an elevated temperature. Temperatures between about 150° and 230° C. (300° and 446° F.) are suitable with temperatures between about 162° and 191° C. (325° and 375° F.) being preferred. Curing times typically range from between about 5 and 45 minutes with a range between about 10 and 35 minutes being more common. The shorter time periods are usually associated with the higher curing temperatures.

The cured coatings are typical evaluated in terms of their properties on Q panels and Parker panels. The former are 7.62 cm by 12.7 cm (3 inch by 5 inch) steel plates 0.5 mm (0.02 inch) thick used to evaluate bendability while the latter are cold rolled 10 cm by 15.25 cm (4 inch by 6 inch) zinc phosphatized steel plates 0.9 mm thick (20 gauge) used to evaluate impact and MEK resistance. Both types can be used to evaluate gloss.

The properties of primary concern are gloss, bendability (flexibility), impact resistance and resistance to solvents. The gloss is conveniently evaluated in accordance with ASTM D-523 and 60° values in excess of about 80 percent are desirable and values of about 90 percent or more are preferred. In the examples which follow unless specific gloss values are reported, the 60° gloss value were around 90 (gloss values were measured on each coating produced but showed such uniformity that specific reports were omitted). The flexibility is conveniently evaluated in accordance with ASTM D-522 and the ability to sustain a 180° bend about a 3 mm (0.125 inch) mandrel is desirable. The impact resistance is conveniently evaluated in accordance with ASTM D-2794 utilizing a 1.6 cm (0.625 inch) diameter ball and values of about 18 N-m (160 inch pounds) or greater in both direct and reverse impact are desirable. The resistance to solvents is conveniently evaluated by the number of double rubs with methyl ethyl ketone (MEK) soaked cotton swab which can be sustained without severe damage to the coating. A tolerance to 100 or more double rubs with moderate removal of the coating is acceptable. Total or sever removal indicates an absence of crosslinking.

Another property of interest is powder stability. A fully formulated powder coating composition is commonly stored under ambient conditions for sometime after its production. These conditions may involve elevated temperatures encountered in industrial buildings in hot summer days. It is desirable that the powder remain free flowing after such storage. The tendency of the powder to sinter together and form lumps is a function of both the glass transition temperature of the polyester resin component and of the identity of the curative with which it is blended. Increasing the glass transition temperature of the polyester resin will make it more resistant to forming lumps and more amenable to formulation with curatives which tend to plasticize the polyester and render it more susceptible to sintering.

A simple but effective test to evaluate this powder stability which is recommended by The Powder Coating Institute is to subject it to elevated temperature accelerated aging. A small (4 ounce) wide mouth glass bottle is filled two thirds full and immersed in a 45° C. water bath. The powder is typically visually evaluated on a daily basis. The bottle is removed from the bath, permitted to cool to ambient temperature, and rotated to observe the degree of compaction, if any, which has occurred.

The powder formulations which were evaluated in the examples which follow did display some tendency to form lumps under these test conditions with the tendency decreasing as the glass transition temperature of the polyester component was raised. This did not represent a major problem which would significantly impair the utility of these formulations. The curative, Cymel 1174, used in most of the examples displayed a tendency to cause such agglomeration. In optimizing a commercial formulation this problem can be further addressed by certain additives. For instance, dry blending about 0.5 weight percent of finely ground silica with an extruded and pulverized powder coating composition has alleviated this problem. It is expected that those skilled in the formulation of powder coating compositions can readily develop alternative approaches and a number of additives are promoted for this purpose.

EXAMPLE 1

A sulfonate salt group containing polyester resin was prepared by a direct esterification reaction in which one of the initial reactants carried the salt group. A two liter flask equipped with a heating mantle, stirrer and thermometer and connected to a column packed with stainless steel saddles through which a vacuum could be applied was charged with the following ingredients:

| | | |
|---|---|---|
| 5-sodium sulfo isophthalic acid (5-SSIPA) | 20 gms | (0.075 mol) |
| Isophthalic Acid (IPA) | 20 gms | (0.12 mol) |
| Adipic Acid (AA) | 97 gms | (0.66 mol) |
| Terephthalic Acid (TA) | 960 gms | (5.78 mol) |
| Neopentyl Glycol (NPG) | 723 gms | (6.95 mol) |
| Trimethylolpropane (TMP) | 10 gms | (0.073 mol) |
| Dibutyl Tin Oxide (4201) | (2 gms)[1] | |
| | 1830 gms[2] | |

[1] In these examples the weight of catalyst was not included in the total weight of the reactants charged.
[2] Except for minor losses of glycol during synthesis in these examples, approximately 87 percent of the weight charged was recovered as resin. The remaining 13 percent was the weight of water formed as part of the esterification reaction.

The contents of the flask were gradually heated to a temperature of 230° C. The flask was kept under a slight vacuum of about 29 inches of mercury during the course of the reaction. The acid number and 200° C. ICI cone and plate viscosity were of the reaction mass were monitored by taking periodic samples. After about twenty hours of reaction the acid number was 23.8 and the viscosity was 98 Poise. Thirty six grams of neopentyl glycol were added resulting in a drop of the viscosity to 36 Poise and a drop in the acid number to 3.8. The reaction was then continued for another four hours until the viscosity was 57 Poise. The acid number of the product was 1.2, the hydroxyl number Was 31.9 and the DSC determined glass transition temperature was 51° C. The molten reaction mass was poured into an aluminum tray to solidify.

This resin had a sodium sulphoisophthalate content of 1.1 weight percent or a sulfonate salt group content of 0.42 weight percent. (These percentages were based on the weight of reactants charged but are representative of the final resin because the recovery of 5-SSIPA was about the same as of all the reactants. In each case, there was about 13 percent weight loss attributable to the water formed in the esterification reaction).

EXAMPLE 2

The polyester resin prepared in Example 1 was formulated into a powder coating composition with curative, pigment and flow aids, the powder coating was electrostatically applied to a metal plate and cured and the cured coating was evaluated.

The powder coating composition was prepared by first mixing and then extruding the ingredients. The polyester resin was chopped to particles less than ⅛ inch in size and then mixed for ten minutes in a shaker with the other ingredients according to the following recipe which utilizes a 90:10 resin to curative ratio:

|  | Grams | Weight Percent |
|---|---|---|
| Polyester Resin | 178.2 | 60 |
| Tetramethoxy methyl glycol uril[3] | 19.8 | 6.7 |
| Resiflow P97[4] | 3.0 | 1.0 |
| Rutile TiO$_2$[5] | 96.0 | 32.3 |
|  | 297.0 | 100.0 |

[3]Marketed as Cymel 1174 by American Cyanamid Company
[4]Marketed by Estron Chemicals, a polyacrylate flow control additive
[5]Marketed as R960 by DuPont These ingredients were extruded in a two zone, single screw compounding extruder. The feed zone was set at 88° C. (190° F.) and the exit zone was set at 116° C. (240° F.). The extrudate was fed to a water bath and then chopped to a granulate. The granulate was ground until most of it would pass a Number 140 sieve (105 micron opening).

The powder was electrostatically sprayed onto four Parker steel panels and four Q panels were baked in an oven for fifteen minutes at 400° F.

The plates had a variable 60° gloss according to ASTM D-523 ranging from about 40 to 85 on a series of eight panels. The surface had an orange peel texture which made evaluation of the ASTM D-522 bend test over an 0.3 cm (0.125 inch) mandrel difficult. This surface was not attacked by the contact with methyl ethyl ketone (MEK) and the coating suffered only moderate removal after 100 double rubs of a cotton swab. One plate passed both the direct and reverse impact test according to ASTM D-2794 with a 1.6 cm (⅝") diameter ball at 18 N-m (160 inch pounds).

The less than optimum surface was attributed to the failure to include benzoin in the formulation.

The formulated powder coated composition had a tendency to agglomerate when stored for extended periods at 45° C. (113° F.). This was attributed to a plasticization effect from the Cymel 1174 curative and the low glass transition temperature of the polyester resin.

COMPARISON EXAMPLE 1

A polyester resin similar to that of Example 1 was prepared by direct esterification using a similar procedure and ingredients but omitting any sulfonate salt group bearing reactant. The synthesis was conducted in a polyester production reactor equipped with a hot oil heating source, stirrer and temperature probe and connected to a column packed with stainless steel saddles. To this reactor was charged:

| Isophthalic Acid | 300 lbs |
|---|---|
| Adipic Acid | 965 lbs |
| Terephthalic Acid | 9580 lbs |
| Neopentyl Glycol | 7230 lbs |
| Trimethylolpropane | 100 lbs |
| Dibutyl Tin Oxide | 20 lbs |

The reaction mass was allowed to attain a temperature of 240° C. Vacuum was applied as necessary to maintain the rate of reaction. Samples were periodically removed and the acid number and the 200° C. ICI cone and plate viscosity were determined. The batch was dropped on a belt when the acid number reached a value of 5.0 and the viscosity reached a value of 5600 cps. at 200° C.

This resin had a hydroxyl value of 22.0 and a glass transition temperature of 51° C.

The polyester resin was formulated into a powder coating composition in the same manner and in accordance with the same recipe as in Example 2. The fine powder obtained was electrostatically sprayed on bonderite steel panels and the panels were baked in an oven for fifteen minutes at 204° C. (400° F.). The resultant coating displayed less than 5 inch pounds of impact resistance in the reverse impact test (ASTM D-2794 with a 1.6 cm (⅝") ball) and was totally removed from the test panel after three rubs with MEK. It was concluded that essentially no curing reaction had occurred.

This polyester resin is a commercial product which cures very satisfactorily with traditional curatives such as caprolactam blocked isophorone diisocyanate.

EXAMPLE 3

A sulfonate salt group containing polyester resin similar to that of Example 1 but with a higher glass transition temperature was prepared in essentially the same manner as Example 1. The following reactants were initially charged and 46 grams of neopentyl glycol and 8.5 grams of hexane diol were added during the course of synthesis:

|  | Grams | Mols |
|---|---|---|
| 5-sodium sulfo isophthalic acid (5-SSIPA) | 20 | 0.075 |
| Isophthalic Acid (IPA) | 178 | 1.07 |
| Terephthalic Acid (TA) | 770 | 4.64 |
| Hexane diol (HD) | 70 | 0.59 |
| Neopentyl Glycol (NPG) | 560 | 5.38 |
| Trimethylolpropane (TMP) | 10 | 0.073 |
| Dibutyl Tin Oxide (4201) | (1.5) |  |
|  | 1608 |  |

The resultant resin had the following characteristics:

| Acid Number | 1.8 |
|---|---|
| Hydroxyl Number | 32 |
| 200° C. ICI Cone and Plate Viscosity | 56 Poise |
| DSC Glass Transition Temperature | 58.8° C. |
| 5-SSIPA Content | 1.25 weight percent |
| Sulfonate Salt Group Content | 0.48 weight percent |

EXAMPLE 4

The polyester resin prepared in Example 3 was evaluated in a manner essentially the same as that of Example 2 utilizing the following recipes which had a resin to curative weight ratios of 90:10 and 94:6, respectively:

|  | Recipe 1 | | Recipe 2 | |
|---|---|---|---|---|
|  | Grams | Weight % | Grams | Weight % |
| Polyester Resin | 178.2 | 59.4 | 186.1 | 62 |
| Tetramethoxy methyl glycol uril | 19.8 | 6.6 | 11.9 | 4.0 |
| Resiflow P 97 | 3.0 | 1.0 | 3.0 | 1.0 |
| Benzoin | 3.0 | 1.0 | 3.0 | 1.0 |
| Rutile TiO$_2$ | 96.0 | 32 | 96 | 32 |
|  | 300.0 | 100.0 | 300.0 | 100.0 |

Two Parker panels and two Q panels were electrostatically sprayed with each recipe and all eight panels were baked for fifteen minutes at 204° C. (400° F.).

The electrostatically sprayed Parker and Q panels were evaluated in accordance with several bake schedules as follows:

| Bake Schedule | Recipe 1 | Recipe 2 | Recipe 3 |
|---|---|---|---|
| 15 min./204° C. (400° F.) | pass 18 N-m impact pass 0.3 cm bend MEK slight dulling and slight removal | pass 18 N-m impact pass 0.3 cm bend MEK slight dulling and moderate removal | fail 18 N-m impact — — — |
| 35 min./190° C. (375° F.) | pass 18 N-m impact MEK slight dulling and slight removal | pass 18 N-m impact MEK slight dulling and moderate removal | fail 18 N-m impact — — |
| 10 min./218° C. (425° F.) | fail 18 N-m impact MEK slight dulling and moderate removal | fail 18 N-m impact MEK dulling and total removal | — — — |

Three of the plates sprayed with recipe 1 had a 60° gloss of 90 while the fourth had a gloss of 83. This lower gloss was attributed to poor placement in the oven.

Two of the recipe 2 panels had a gloss of 90, one had a gloss of 88 and one had a gloss of 72.

One Q panel sprayed with each recipe was tested in the 0.3 cm (0.125 inch) mandrel bend test with a satisfactory result. One Parker panel sprayed with each recipe was tested in both direct and reverse impact and passed both at 18 Nm (160 inch pounds).

The recipe 2 coating on Q panel showed very slight attack on exposure to MEK but was softened and removed by rubbing with a cotton swab.

EXAMPLE 5

A sulfonate salt group containing resin with the same charge of reactants as in Example 3 was prepared in a very similar manner except that a lower hydroxyl number and a higher acid number were obtained. Twenty six grams of neopentyl glycol were added during the course of synthesis. The resultant resin had the following characteristics:

| | |
|---|---|
| Acid Number | 5.9 |
| Hydroxyl Number | 27.5 |
| 200° C. ICI Cone and Plate Viscosity | 74 Poise |
| DSC Glass Transition Temperature | 59° C. |
| 5-SSIPA Content | 1.25 weight percent |
| Sulfonate Salt Group Content | 0.48 weight percent |

EXAMPLE 6

The polyester resin prepared in Example 5 was evaluated in essentially the same manner as that of Examples 2 and 4 utilizing the following three recipes which had resin to curative weight ratios of 90:10, 94:6 and 96:4, respectively:

|  | Recipe 1 | | Recipe 2 | | Recipe 3 | |
|---|---|---|---|---|---|---|
|  | Grams | Weight % | Grams | Weight % | Grams | Weight % |
| Polyester Resin of Example 5 | 178.2 | 59.4 | 186.1 | 62.0 | 190.1 | 63.4 |
| Tetramethoxy methyl glycol uril | 19.8 | 6.6 | 11.9 | 4.0 | 7.9 | 2.6 |
| Resiflow P97 | 3.0 | 1.0 | 3.0 | 1.0 | 3.0 | 10 |
| Benzoin | 3.0 | 1.0 | 3.0 | 1.0 | 3.0 | 1.0 |
| Rutile TiO$_2$ | 96.0 | 32.0 | 96.0 | 32.0 | 95.5 | 32 |
| | 300.0 | 100.0 | 300.0 | 100.0 | 300.0 | 100.0 |

The 60° gloss for Recipes 1 and 2 ranged between 81 and 92 for almost all of the 18 panels tested (one panel had a 50 gloss and another a 70 gloss). The gloss for Recipe 3 was not measured.

The inferior performance of Recipe 3 was attributed to the presence of insufficient curative to yield a cross inked coating.

The weaker impact of Recipes 1 and 2 after baking at 218° C. (425° F.) was attributed to oxidative degradation. Coatings which utilize methoxy alkylene amino curatives are known to be subject to over baking degradation. However, this problem is readily avoided by using lower curing temperatures.

EXAMPLE 7

A sulfonate salt group containing polyester resin with a higher salt group content than that of the resins of Examples 1, 3 and 5 was prepared in essentially the same manner as Example 1. The following reactants were initially charged and 35 grams of NPG was charged during the course of the reaction:

| | Grams | Mols |
|---|---|---|
| 5-SSIPA | 30 | 0.11 |
| IPA | 171 | 1.0 |
| TA | 770 | 4.6 |
| HD | 70 | 0.6 |
| NPG | 560 | 5.4 |
| TMP | 10 | 0.07 |
| 4201 | (1.5) | — |
| | 1611 | |

The resultant resin has the following characteristics:

| | |
|---|---|
| Acid Number | 0.2 |
| Hydroxyl Number | 27.7 |
| 200° C. ICI Cone and Plate Viscosity | 88 Poise |
| DSC Glass Transition Temperature | 61° C. |
| 5-SSIPA Content | 1.86 weight percent |

-continued

| Sulfonate Salt Group Content | 0.72 weight percent |
|---|---|

EXAMPLE 8

The polyester resin of Example 7 was evaluated in essentially the same manner as that of Examples 2, 4 and 6 utilizing the following two recipes which both had a resin to curative ratio of 94:6:

|  | Recipe 1 | | Recipe 2 | |
|---|---|---|---|---|
|  | Grams | Weight % | Grams | Weight % |
| Polyester Resin | 186.1 | 62.0 | 186.1 | 54.7 |
| Tetramethoxy methyl glycol uril | 11.9 | 4.0 | 11.9 | 3.5 |
| Resiflow P 97 | 3.0 | 1.0 | 3.0 | 0.9 |
| Benzoin | 3.0 | 1.0 | 3.0 | 0.9 |
| Rutile TiO$_2$ | 96.0 | 32.0 | 136.0 | 40 |
|  | 300 | 100 | 340 | 100 |

The electrostatically sprayed Parker and Q panels were evaluated using several bake schedules as follows:

| Bake Schedule | Recipe 1 | Recipe 2 |
|---|---|---|
| 15 min./204° C. (400° F.) | fail 18 N-m impact pass 0.3 cm bend | fail 18 N-m impact pass 0.3 cm bend |
| 10 min./204° C. (400° F.) | pass 18 N-m impact MEK very slight attack and slight removal | pass 18 N-m impact MEK slight attack slight removal |
| 20 min./190° C. (375° F.) | pass 18 N-m impact MEK very slight dulling and slight removal | pass 18 N-m impact MEK very slight dulling and slight removal |
| 20 min./177° C. (350° F.) | pass 18 N-m impact MEK very slight dulling and no removal | pass 18 N-m impact MEK very slight dulling and no removal |
| 15 min./190° C. (375° F.) | pass 18 N-m impact pass 0.3 cm bend MEK very slight dulling and no removal | |
| 10 min./190° C. (375° F.) | pass 18 N-m impact pass 0.3 cm bend MEK very slight dulling and no removal | |
| 15 min./177° C. (350° F.) | pass 18 N-m impact pass 0.3 cm bend MEK very slight dulling and slight removal | |
| 20 min./163° C. (325° F.) | pass 18 N-m impact pass 0.3 cm bend MEK slight dulling and slight removal | |
| 20 min./149° C. (300° F.) | fail 18 N-m impact MEK total removal | |
| 35 min./149° C. (300° F.) | fail 18 N-m impact MEK moderate removal | |
| 60 min./149° C. (300° F.) | fail 18 N-m impact MEK dulling and slight removal | |

The higher catalyst level of this resin made it more susceptible to degradation at longer times at higher temperatures but also made it possible to cure it at lower temperatures. However, there remains a comfortable safety margin for extrusion compounding since even long term exposure at 149° C. (300° F.) only caused minimal curing and exposure for as long as 20 minutes caused no readily observable curing.

EXAMPLE 9

A sulfonate salt group containing polyester with a salt group content higher than that of Example 7 was prepared in essentially the same manner as Example 1. The following reactants were initially charged and 130 grams of NPG were added during the course of the reaction:

|  | Grams | Mols |
|---|---|---|
| 5-SSIPA | 140 | 0.52 |
| IPA | 442 | 2.66 |
| TA | 2150 | 12.95 |
| HD | 196 | 1.66 |
| NPG | 1568 | 15.1 |
| TMP | 28 | 0.21 |
| 4201 | (4.2) | — |
|  | 4524 | |

The resultant resin had the following characteristics:

| Acid Number | 4.1 |
|---|---|
| Hydroxyl Number | 20.2 |
| 200° C. ICI Cone and Plate Viscosity | 84 Poise |
| DSC Glass Transition Temperature | — |
| 5-SSIPA Content | 3.1 weight percent |
| Sulfonate Salt Group Content | 1.2 weight percent |

EXAMPLE 10

The polyester resin of Example 9 was evaluated in essentially the same manner as that of Examples 2, 4, 6 and 8 utilizing the following recipe which had a resin to curative ratio of 94:6:

|  | Grams | Weight % |
|---|---|---|
| Polyester Resin | 310.2 | 62 |
| Tetramethoxymethyl glycol uril | 19.8 | 4 |
| Resiflow P97 | 5.0 | 1 |
| Benzoin | 5.0 | 1 |
| Rutile TiO$_2$ | 160.0 | 32 |
|  | 500.0 | 100.0 |

Electrostatically sprayed Parker and Q panels were evaluated using several bake schedule as follows:

| Bake Schedule | |
|---|---|
| 10 min./204° C. (400° F.) | fail 18 N-m impact fail 0.3 cm bend |
| 15 min./190° C. (375° F.) | fail 18 N-m impact |
| 15 min./177° C. (350° F.) | fail reverse 18 N-m impact |
| 15 min./163° C. (325° F.) | pass 18 N-m impact |
| 30 min./149° C. (300° F.) | fail 18 N-m impact |
| 45 min./149° C. (300° F.) | fail 18 N-m impact |

The high catalyst level facilitated curing at a low temperature for a fairly short period (163° C. for 15 min.) but increased the susceptibility to overbaking at higher temperatures. Even at this high catalyst level the composition did not cure after long time exposure at 149° C. (300° F.). Thus, even at high catalyst levels there is little danger of premature curing during extrusion compounding.

EXAMPLE 11

A sulfonate salt group containing polyester was prepared with an even higher internal catalyst level and a high carboxylic acid group content. The following reactants were reacted essentially the same manner as described in Example 1 with an additional 100 grams of NPG being added during the course of the reaction:

|  | Grams | Mols |
|---|---|---|
| 5-SSIPA | 65 | 0.24 |
| IPA | 148 | 0.8 |
| TA | 770 | 4.6 |
| HD | 70 | 0.6 |
| NPG | 560 | 5.4 |
| TMP | 10 | 0.07 |
| 4201 | (1.5) | — |
|  | 1623 |  |

The resultant resin had the following characteristics:

| Acid Number | 15.4 |
|---|---|
| Hydroxyl Number | 35.5 |
| 200° C. ICI Cone and Plate Viscosity | 81 Poise |
| 5-SSIPA Content | 4.0 weight percent |
| Sulfonate Salt Group Content | 1.5 weight percent |

EXAMPLE 12

The polyester resin of Example 11 was evaluated in essentially the same manner as the previous even numbered Examples utilizing the same recipe as in Example 8 which had a resin to curative ratio of 94:6.

Electrostatically sprayed Parker and Q panels were evaluated using several bake schedules as follows:

| Bake Schedule | | |
|---|---|---|
| 15 min./204° C. (400° F.) | fail 18 N-m impact | 60° gloss of 86 |
| 10 min./204° C. (400° F.) | fail 18 N-m impact | 60° gloss of 90 |
| 5 min./204° C. (400° F.) | pass 18 N-m impact MEK slight removal | 60° gloss of 91 |
| 15 min./190° C. (375° F.) | fail 18 N-m impact | 60° gloss of 91 |
| 15 min./177° C. (350° F.) | pass 18 N-m impact pass 0.3 cm bend | 60° gloss of 93 |
| 15 min./163° C. (325° F.) | fail 18 N-m impact | 60° gloss of 93 |
| 15 min./149° C. (300° F.) | fail 18 N-m impact | 60° gloss of 90 |
| 45 min./149° C. (300° F.) | fail 18 N-m impact | 60° gloss of 83 |
| 75 min./149° C. (300° F.) | fail 18 N-m impact | 60° gloss of 56 |

This composition displayed properties very similar to those of Example 10 in curing with low temperature short time cycles and in being sensitive to overbaking at higher temperatures. It also displayed a lack of curing at temperatures below 163° C. (325° F.) even at periods long enough to cause a substantial loss of gloss.

EXAMPLE 13

A sulfonate salt group containing resin was prepared in a manner essentially the same as in Example 1 but with the following reactant charge designed to yield a high glass transition temperature:

|  | Grams | Mols |
|---|---|---|
| 5-SSIPA | 30 | 0.11 |
| IPA | 171 | 1.0 |
| TA | 770 | 4.6 |
| NPG | 622 | 6.0 |
| TMP | 10 | 0.07 |
| 4201 | (1.5) | — |
|  | 1603 |  |

No further addition of reactants was added during the course of synthesis.

The resultant resin had the following characteristics:

| Acid Number | 4.9 |
|---|---|
| Hydroxyl Number | 30.5 |
| 200° C. ICI Cone and Plate Viscosity | 81 Poise |
| DSC Glass Transition Temperature | 65° C. |
| 5-SSIPA Content | 1.9 weight percent |
| Sulfonate Salt Group Content | 0.7 weight percent |

EXAMPLE 14

The polyester resin of Example 13 was evaluated in essentially the same manner as that of the previous evaluation examples using the same recipe as Examples 10 and 12, which had a resin to curative ratio of 94:6.

Electrostatically sprayed Parker panels were evaluated using several bake schedules as follows:

| Bake Schedule | |
|---|---|
| 15 min./204° C. (400° F.) | fail 18 N-m impact |
| 25 min./190° C. (375° F.) | fail 18 N-m impact |
| 15 min./190° C. (375° F.) | fail 18 N-m impact |
| 5 min./190° C. (375° F.) | pass 18 N-m impact |
| 15 min./177° C. (350° F.) | pass 18 N-m impact |

This composition displayed a somewhat higher sensitivity to overbaking than that of Example 8 which had the same sulfonate salt group content. This was probably due to a minor loss of flexibility occasioned by the omission of hexane diol from the polyester synthesis in order to obtain a higher glass transition temperature.

EXAMPLE 15

A sulfonate salt group resin very similar to that of Example 13 except that no isophthalic acid was used in the synthesis was prepared in essentially the same manner as in Example 1. The reactant charge was as follows and 55 grams of NPG were added during the course of the reaction:

|  | Grams | Mols |
|---|---|---|
| 5-SSIPA | 30 | 0.11 |
| TA | 941 | 5.7 |
| NPG | 622 | 6.0 |
| TMP | 10 | 0.07 |
| 4201 | (1.5) | — |
|  | 1603 |  |

The resultant resin had the following characteristics:

| | |
|---|---|
| Acid Number | 14.3 |
| Hydroxyl Number | 42.7 |
| 200° C. ICI Cone and Plate Viscosity | 52 Poise |
| DSC Glass Transition Temperature | 65° C. |
| 5-SSIPA Content | 1.9 weight percent |
| Sulfonate Salt Group Content | 0.7 weight percent |

EXAMPLE 16

The polyester resin of Example 15 was evaluated in essentially the same manner as that of the previous evaluation examples using the same recipe as Examples 10, 12 and 14 which had a resin to curative ratio of 94:6, as well as the following recipe which had a resin to curative ratio of 90:10.

| | Grams | Weight % |
|---|---|---|
| Polyester Resin of Example 15 | 297.0 | 59.4 |
| Tetramethoxymethyl glycol uril | 33.0 | 6.6 |
| Resiflow P97 | 5.0 | 1 |
| Benzoin | 5.0 | 1 |
| Rutile TiO$_2$ | 160.0 | 32 |
| | 500.0 | 100.0 |

The initial results with both recipes, a failure to pass either the 18 N-m impact test or the 0.3 cm bend test, were felt to be unrepresentative. On retesting of the above recipe, the following results were obtained:

| Bake Schedule | |
|---|---|
| 10 min./177° C. (350° F.) | pass 18 N-m impact<br>MEK moderate removal |
| 10 min./163° C. (325° F.) | pass 18 N-m impact<br>MEK moderate removal |

These results were determined to be more representative because variations in the involved techniques can cause a composition to fail to develop its full potential but cannot falsely impart properties to a composition which does not possess them. It was not unexpected that this resin which did not contain any traditional flexibilizing reactant would be more sensitive to testing technique when evaluated in tests (impact and bend) which involve flexibility.

EXAMPLE 17

A sulfonate group containing resin was prepared in a manner essentially similar to that of Example 1 using the following reactant charge to yield an intermediate level sulfonate group content for blending:

| | Grams | Mols |
|---|---|---|
| 5-SSIPA | 70 | 0.26 |
| IPA | 442 | 2.66 |
| TA | 2156 | 12.99 |
| HD | 265 | 2.25 |
| NPG | 1570 | 14.42 |
| TMP | 28 | 0.21 |
| 4201 | (4.2) | — |
| | 4530 | |

The resultant resin had the following characteristics:

| | |
|---|---|
| Acid Number | 5.8 |
| Hydroxyl Number | 28.2 |
| 200° C. ICI Cone and Plate Viscosity | 87 Poise |
| 5-SSIPA Content | 1.5 weight percent |
| Sulfonate Salt Group Content | 0.6 weight percent |

EXAMPLE 18

The polyester resin of Example 17 was evaluated in essentially the same manner as that of the previous evaluation examples except that the curative was a master batch of hexa(methoxymethyl)melamine in a hydroxyl terminated polyester. This melamine curative was obtained from American Cyanamide under the tradename Cymel 303. It was a room temperature liquid with an equivalent weight between about 130 and 190. The polyester was a commercial powder coating product normally sold for combination with isocynate curatives which had an acid number of 5 and a hydroxyl number of 24.6. It was synthesized from terephthalic acid, isophthalic acid, hexane diol, neopentyl glycol and trimethylol propane.

The master batch was prepared by melting the commercial polyester in an oven at 150° C. (300° F.) and stirring the Cymel 303 melamine into the molten mass. The mixture was poured out and permitted to solidify. The master batch was then reduced to an appropriate particle size for feeding to a compounding extruder.

A powder coating composition was prepared in essentially the same manner described in Example 2 using the following recipe:

| | Grams | Weight % |
|---|---|---|
| Polyester Resin of Example 17 | 99.0 | 33.0 |
| Master batch of Cymel 303 | 99.0 | 33.0 |
| Resiflow P97 | 3.0 | 1 |
| Benzoin | 3.0 | 1 |
| Rutile TiO$_2$ | 96.0 | 32 |
| | 300.0 | 100.0 |

Electrostatically sprayed Parker and Q panels were evaluated using several bake schedules as follows:

| Bake Schedule | |
|---|---|
| 15 min./177° C. (350° F.) | pass 18 N-m impact<br>fail 0.3 cm bend<br>MEK very slight removal<br>60° gloss of 62 |
| 15 min./163° C. (325° F.) | pass 18 N-m impact<br>one pass one fail 0.3 cm bend<br>MEK very slight removal<br>60° gloss of 48 |

The coatings displayed pinholes which caused the lower than normal gloss and probably caused the bend failures. The presence of pinholes is typically an indication of too fast a gel time which would be correctable by appropriate changes in the formulation of the coating composition.

The favorable impact and MEK test results establish the utility of the concept even though the formulation would require some optimization to be readily acceptable in the market place.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

What is claimed is:

1. In a hydroxyl terminated polyester suitable for formulation into powder coating the improvement comprising sufficient concentration of pendant sulfonate salt groups to catalyze reaction of the hydroxyl groups with methoxylalkylene amino groups wherein said polyester comprises an amount of said pendant sulfonate salt groups of from about 0.1 to about 4 weight percent based on the weight of said polyester and an amount of acid branching agent or polyol branching agent of up to about 4 mol percent based on mols of the acid or polyol content of said polyester respectively.

2. The polyester of claim 1, wherein the sulfonate salt is the salt of an alkali metal.

3. The polyester of claim 2, wherein the alkali metal is sodium.

4. The polyester of claim 3, wherein the 200° C. ICI cone and plate viscosity is above about 10 Poise.

5. The polyester of claim 4, wherein the 200° C. ICI cone plate viscosity is between about 20 and 70 Poise.

6. The polyester of claim 1, wherein the sulfonate salt group is bound to an aryl ring.

7. The polyester of claim 6, wherein the sulfonate salt group is derived from 5-sulfo isophthalic acid.

8. The polyester of claim 7, wherein the sulfonate salt group is derived from 5-sodium sulfo isophthalic acid.

9. The polyester of claim 1, wherein the sulfonate salt group content is between about 0.25 and 4.0 weight percent.

10. The polyester of claim 9, wherein the sulfonate salt group content is between about 0.3 and 2 weight percent.

11. A hydroxyl group bearing polyester resin having
    a) a DSC determined glass transition temperature of at least about 40° C.,
    b) a 200° C. ICI cone and plate viscosity between about 20 and 70 Poise,
    c) a sulfonate salt group content between about 0.1 and 4 weight percent,
    d) a hydroxyl number between about 10 and 60,
    e) an acid number less than about 15, and
    f) a branching agent component of up to 4 mol percent based on the moles of polyol component included in synthesis of said polyester.

12. The polyester of claim 11, wherein the hydroxyl number is between about 20 and 50.

13. The polyester of claim 11, wherein at least about 65 mol percent of the acid residues are derived from an aromatic carboxylic acid.

14. The polyester of claim 13, wherein at least 60 mol percent of the acid residues are derived from terephthalic acid.

15. The polyester of claim 14, wherein at least about 80 mol percent of the acid residues are derived from terephthalic acid.

16. The polyester of claim 11, wherein at least about 80 mol percent of the diol residues are derived from neopentyl glycol.

17. The polyester of claim 11, wherein
    a) at least about 80 mol percent of the acid residues are derived from terephthalic acid,
    b) at least about 80 mol percent of the diol residues are derived from neopentyl glycol,
    c) the amount of said branching agent is between about 0.5 and 1.5 mol percent, and
    d) the DSC determined glass transition temperature is greater than about 55° C.

18. The polyester of claim 17, wherein
    a) between about 10 and 20 mol percent of the acid residues are derived from isophthalic acid,
    b) the sulfonate salt groups are provided by 5-sodium sulfo isophthalic acid, and
    c) the branching agent is trimethylol propane.

19. The polyester of claim 17, wherein
    a) the acid residues are derived solely from terephthalic acid and 5-sodium sulfoisophthalic acid,
    b) the diol residues are derived solely from neopentyl glycol, and
    c) the branching agent is trimethylol propane.

20. The polyester of claim 17, wherein
    a) the hydroxyl number is between about 25 and 50,
    b) the DSC determined glass transition temperature is of at least about 55° C., and
    c) the sulfonate salt group content is between about 0.3 and 2 weight percent.

21. In a process for synthesizing a hydroxyl functional polyester resin suitable for powder coating by esterifying or transesterifying polyester forming reactants comprising an aromatic dicarboxylic acid or a readily transesterifiable ester thereof and an aliphatic diol the improvement which comprises including a sufficient amount of a sulfonate salt group bearing reactant to result in a polyester with a sulfonate salt group content of between about 0.1 and 4 weight percent and including a branching agent component of up to about 4 mol percent based on the moles of polyol included in the synthesis of said polyester.

22. The process of claim 21, wherein the sulfonate salt group is bound to an aryl ring.

23. The process of claim 21, wherein the reactants include between about 0.65 and 1.5 mol percent of branching agent, based on the mols of diol component.

24. The process of claim 21, wherein the acid component comprises at least about 80 mol percent of terephthalic acid.

25. The process of claim 21, wherein the reaction is conducted to yield a polyester with a 200° C. ICI cone and plate viscosity between about 10 and 90 Poise.

26. The polyester of claim 11, wherein the hydroxyl number is between 25 and 50.

* * * * *